US007146241B2

(12) United States Patent
Kondo

(10) Patent No.: US 7,146,241 B2
(45) Date of Patent: Dec. 5, 2006

(54) MACHINE TOOL CONTROL APPARATUS

(75) Inventor: Yukio Kondo, Toyama (JP)

(73) Assignee: Nippei Toyama Corporation, Tokyo (JP)

( * ) Notice: Subject to any disclaimer, the term of this patent is extended or adjusted under 35 U.S.C. 154(b) by 139 days.

(21) Appl. No.: 10/986,786

(22) Filed: Nov. 15, 2004

(65) Prior Publication Data

US 2005/0119782 A1  Jun. 2, 2005

(30) Foreign Application Priority Data

Nov. 13, 2003  (JP)  ............ P.2003-383980
Oct. 18, 2004  (JP)  ............ P.2004-303402

(51) Int. Cl.
*G06F 19/00* (2006.01)
(52) U.S. Cl. ............ 700/181; 700/17; 700/79; 318/567; 714/38; 716/17
(58) Field of Classification Search .......... 700/17, 700/18, 79, 181; 318/567; 714/38; 716/17
See application file for complete search history.

(56) References Cited

U.S. PATENT DOCUMENTS

| | | | | |
|---|---|---|---|---|
| 4,683,549 | A * | 7/1987 | Takaki | ............ 712/244 |
| 5,828,568 | A * | 10/1998 | Sunakawa et al. | ............ 700/79 |
| 6,281,650 | B1 * | 8/2001 | Yutkowitz | ............ 318/561 |
| 6,473,659 | B1 * | 10/2002 | Shah et al. | ............ 700/79 |
| 6,594,530 | B1 * | 7/2003 | Glanzer et al. | ............ 700/18 |
| 2002/0120914 | A1 * | 8/2002 | Gupta et al. | ............ 716/17 |
| 2005/0193269 | A1 * | 9/2005 | Haswell et al. | ............ 714/38 |

FOREIGN PATENT DOCUMENTS

JP        5-33202 U      4/1993

* cited by examiner

*Primary Examiner*—Albert W. Paladini
*Assistant Examiner*—Douglas S. Lee
(74) *Attorney, Agent, or Firm*—Sughrue Mion, PLLC

(57) ABSTRACT

A machine tool control apparatus includes: a control program storage unit that stores control programs for performing standard running control. The control program storage unit includes a basic data memory that sets a control program for performing standard running, and a variable data memory that temporarily alters part of the control program to set a control program for performing temporary running. The machine tool control apparatus further includes a parameter check unit that checks whether a basic parameter stored in the basic data memory and a variable parameter stored in the variable data memory are "matched"; and a temporary running confirmation operation unit that enables the standard running when a parameter check result from the parameter check unit is "match" and that enables the temporary running by performing a temporary running confirmation operation while disenabling the standard running when the parameter check result is "mismatch".

5 Claims, 5 Drawing Sheets

FIG. 2

| M/C TYPE | AD-DRESS | ITEM | BASIC PARAMETER (SP) | VARIABLE PARAMETER (CP) |
|---|---|---|---|---|
| A | 1 | M/C TYPE A | 1 | 1 |
| | 2 | CONVEYING DEVICE A | 1 | 1 |
| | 3 | CONVEYING ORIGINAL POSITION | 1 | 1 |
| | 4 | VERTICAL CONVEYANCE ON ASCENDING END SIDE | 1 | 1 |
| | 5 | FIXTURE A | 1 | 1 |
| | 6 | FL NET | 1 | 1 |
| | 7 | DEVICE NET | 0 | 0 |
| | 8 | | | |
| | 9 | | | |
| | 10 | | | |
| B | 11 | M/C TYPE B | 0 | 0 |
| | 12 | CONVEYING DEVICE B | 0 | 0 |
| | 13 | CONVEYING ORIGINAL POSITION | 0 | 0 |
| | 14 | VERTICAL CONVEYANCE ON ASCENDING END SIDE | 1 | 1 |
| | 15 | FIXTURE B | 1 | 1 |
| | 16 | FL NET | 1 | 1 |
| | 17 | DEVICE NET | 0 | 0 |
| | 18 | | | |
| | 19 | | | |
| | 20 | | | |
| C | 21 | M/C TYPE C | 0 | 0 |
| | 22 | CONVEYING DEVICE C | 0 | 0 |
| | 23 | CONVEYING ORIGINAL POSITION | 1 | 1 |
| | 24 | VERTICAL CONVEYANCE ON ASCENDING END SIDE | 0 | 0 |
| | 25 | FIXTURE C | 1 | 1 |
| | 26 | FL NET | 0 | 0 |
| | 27 | DEVICE NET | 1 | 0 | MIS-MATCH |
| | 28 | | | |
| | 29 | | | |
| | 30 | | | |

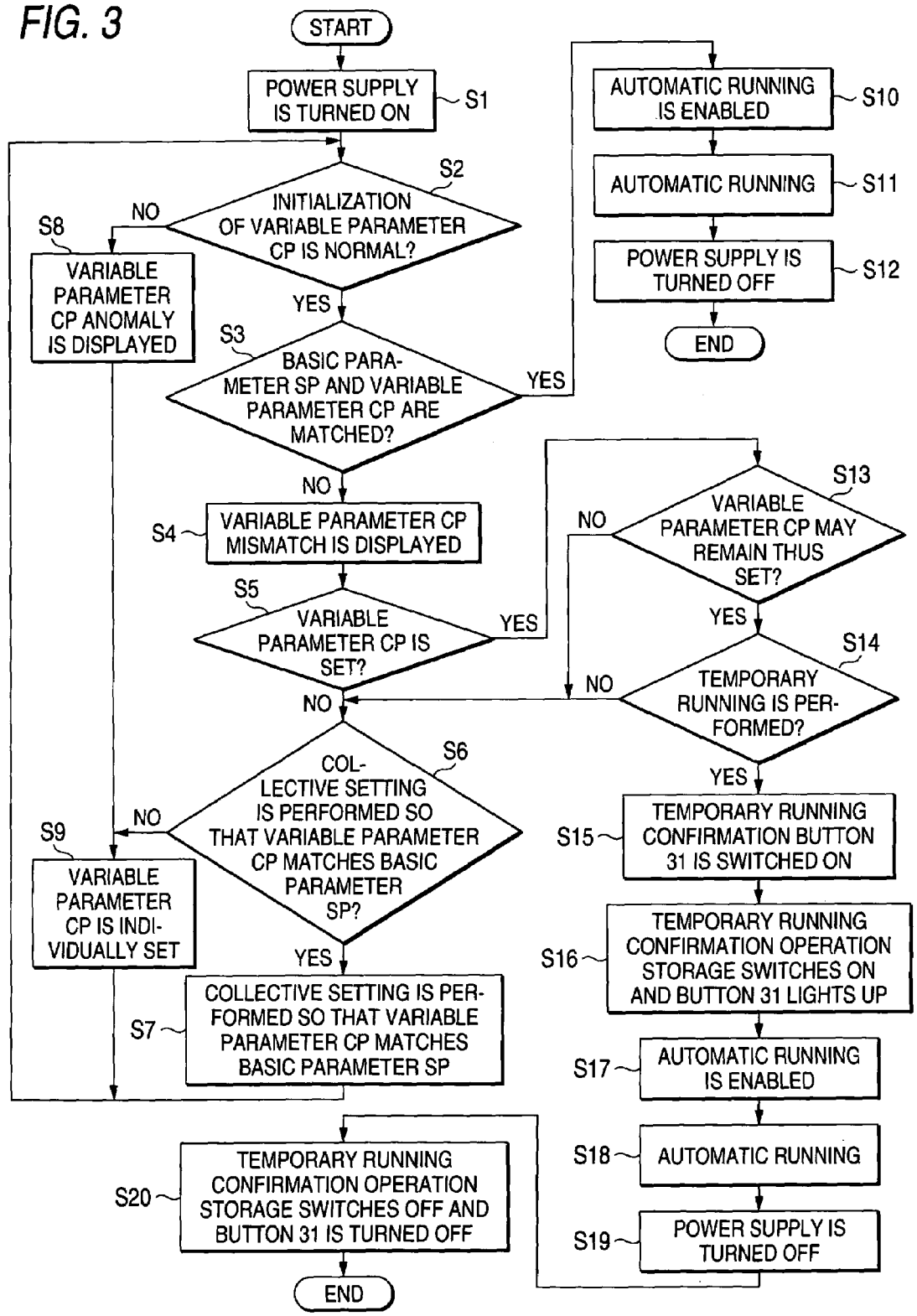

MACHINE TOOL CONTROL APPARATUS

BACKGROUND OF THE INVENTION

1. Field of the Invention

The present invention relates to a control apparatus for controlling a work processing operation of a machine tool.

2. Background Art

To standardize sequence programs necessary for work processing operations regardless of the specifications of a machine tool, a conventional machine tool control apparatus is configured to set standard sequence programs (referred to hereinafter as a basic parameter) serving as standards in response to the specifications of the machine tool. Upon running of the unfinished machine tool during the manufacturing stage of the machine tool and also upon temporary running of the machine tool during a failure, part of the basic parameter is temporarily switched, thus running the machine tool based on this temporarily set parameter. (See JP-UM-A-5-33202)

SUMMARY OF THE INVENTION

In reality, there is the problem that the conventional machine tool control apparatus, which temporarily switches part of the basic parameter, has the following risk. That is, after the machine tool is finished and also after the machine tool is recovered from the failure, an operator erroneously run the machine tool without returning the altered temporary parameter to the original basic parameter. Thus, the machine tool performs an erroneous sequence operation, which induces a failure.

The invention has been made to solve the problem consisting in the aforesaid conventional technology. It is an object of the invention to provide a machine tool control apparatus in which after a machine tool is run based on a variable parameter obtained by temporarily altering a basic parameter, the machine tool can be prevented from being erroneously run without returning to the original basic parameter.

To achieve the object, the invention provides a machine tool control apparatus including: a control program storage unit that stores therein control programs for performing standard running control in correspondence with specifications of a machine tool, the control program storage unit being provided with: a basic data memory that sets a control program for performing standard running, and a variable data memory that temporarily alters part of the control program to set a control program for performing temporary running; a parameter check unit that checks whether a basic parameter stored in the basic data memory and a variable parameter stored in the variable data memory are "matched" with each other; and a temporary running confirmation operation unit that enables the standard running when a parameter check result from the parameter check unit is "match" and that enables the temporary running by performing a temporary running confirmation operation while disenabling the standard running when the parameter check result is "mismatch".

BRIEF DESCRIPTION OF THE DRAWINGS

The present invention may be more readily described with reference to the accompanying drawings, in which:

FIG. 2 is an explanatory diagram showing an example of a basic parameter and a variable parameter that are set in response to specifications of a machine tool;

FIG. 3 is a flowchart showing a running operation of the machine tool;

DETAILED DESCRIPTION OF THE PREFERRED EMBODIMENTS

An embodiment of a machine tool control apparatus in which the invention is embodied will hereinafter be described in accordance with the drawings.

Figure 1:
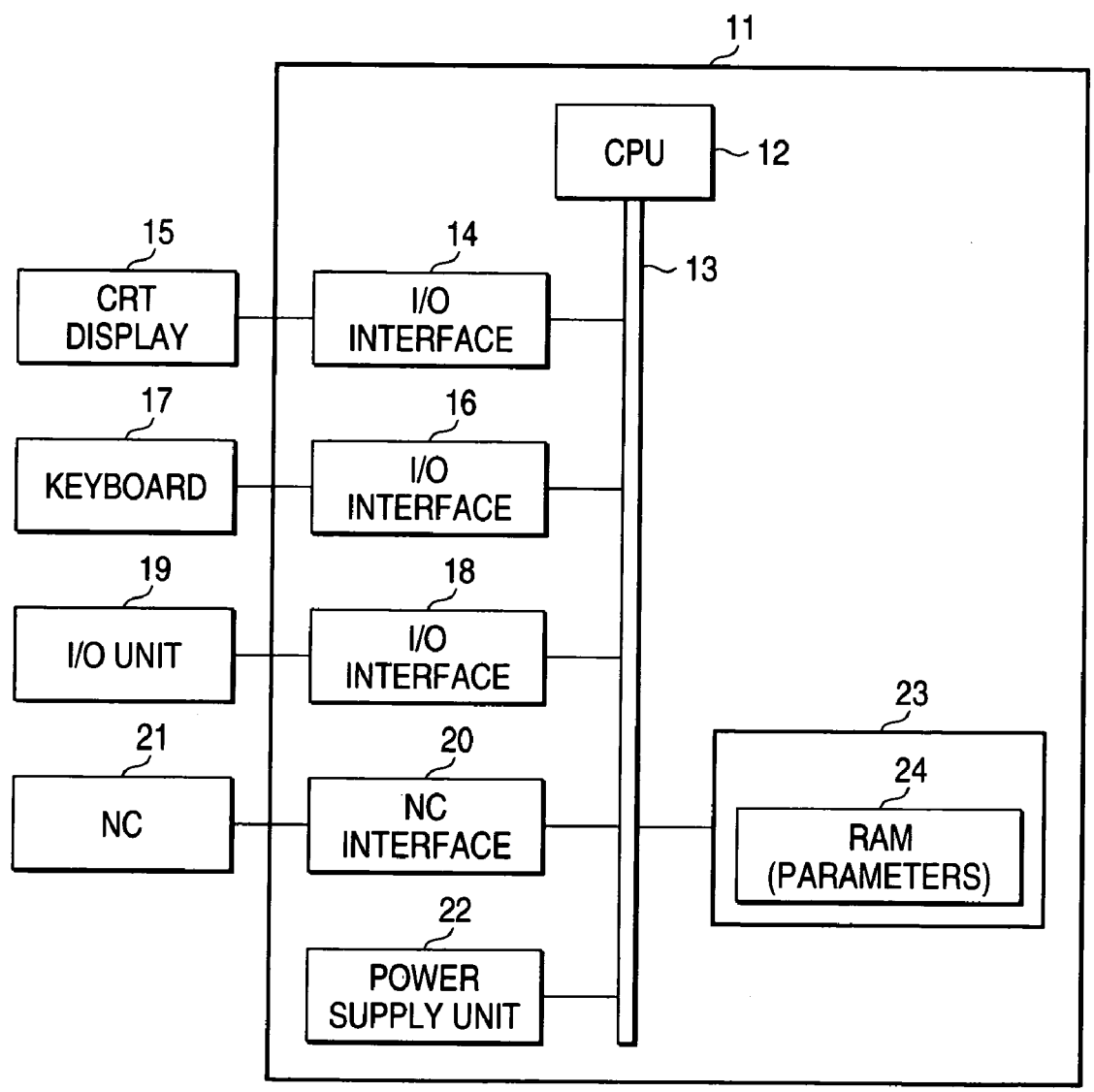
FIG. 1 is a block circuit diagram of a machine tool control apparatus of the invention.

FIG. 1 is a block circuit diagram of a machine tool control apparatus 11. A central processing unit (CPU) 12 provided in this control apparatus 11 is connected via a data bus 13 and an I/O interface 14 with a CRT display 15 functioning as a temporary running confirmation display unit. Besides, the CPU 12 is connected via an I/O interface 16 with a keyboard 17 for entering various data, via an I/O interface 18 with various devices (an I/O unit 19), and via an NC interface 20 with a numerical control device (NC) 12 for numerically controlling a machine tool. Besides, the control apparatus 11 includes a power supply unit 22.

The CPU 12 is connected with a readable/writable random access memory (RAM) 23 for storing various data. This RAM 23 pre-stores therein control programs for controlling standard running operations suitable for the specifications of the machine tool. Besides, the RAM 23 includes a parameter storage area 24 functioning as the basic/variable parameter storage units that sets the control programs.

In the embodiment, the CPU 12, CRT display 15, keyboard 17, RAM 23, parameter storage area 24, etc. function as a control program storage unit, a parameter check unit, a temporary running confirmation operation unit, and a temporary running confirmation display unit that notifies an operator by displaying that a confirmation operation has been performed by the temporary running confirmation operation unit.

Various data to be stored in the parameter storage area 24 of the RAM 23 will now be described according to FIG. 2.

The embodiment is configured as follows. That is, any one of three types A, B, and C of running operation modes is selected in response to the corresponding one of three specifications of the machine tool. Thus, various items necessary for running are stored as parameters in correspondence with respective addresses. Besides, the keyboard 17 is operated whereby the parameter storage area 24 has a basic parameter SP pre-set to either "1" or "0". Furthermore, any one of the individual items is rewritten and stored as a variable parameter CP in correspondence with the basic parameter SP. And, for example, when individual items of the variable parameter CP are set similar to those of the basic parameter SP of A type, the standard running for work processing operation of the machine tool under the A type specification is controlled by the basic parameter SP of A type. Besides, for example, with the basic parameter SP of C type being set, when the same item of the variable parameter CP as that thereof is not selected in the item of the 27$^{th}$ address in FIG. 2, i.e., when the variable parameter CP is set to "0", the basic parameter SP and the variable parameter CP are "mismatched". In this case, standard running control cannot be effected, but a temporary running confirmation operation to be described later is performed, whereby the temporary running for work processing operation of the machine tool is controlled based on this "mismatched" variable parameter CP.

Figure 5:
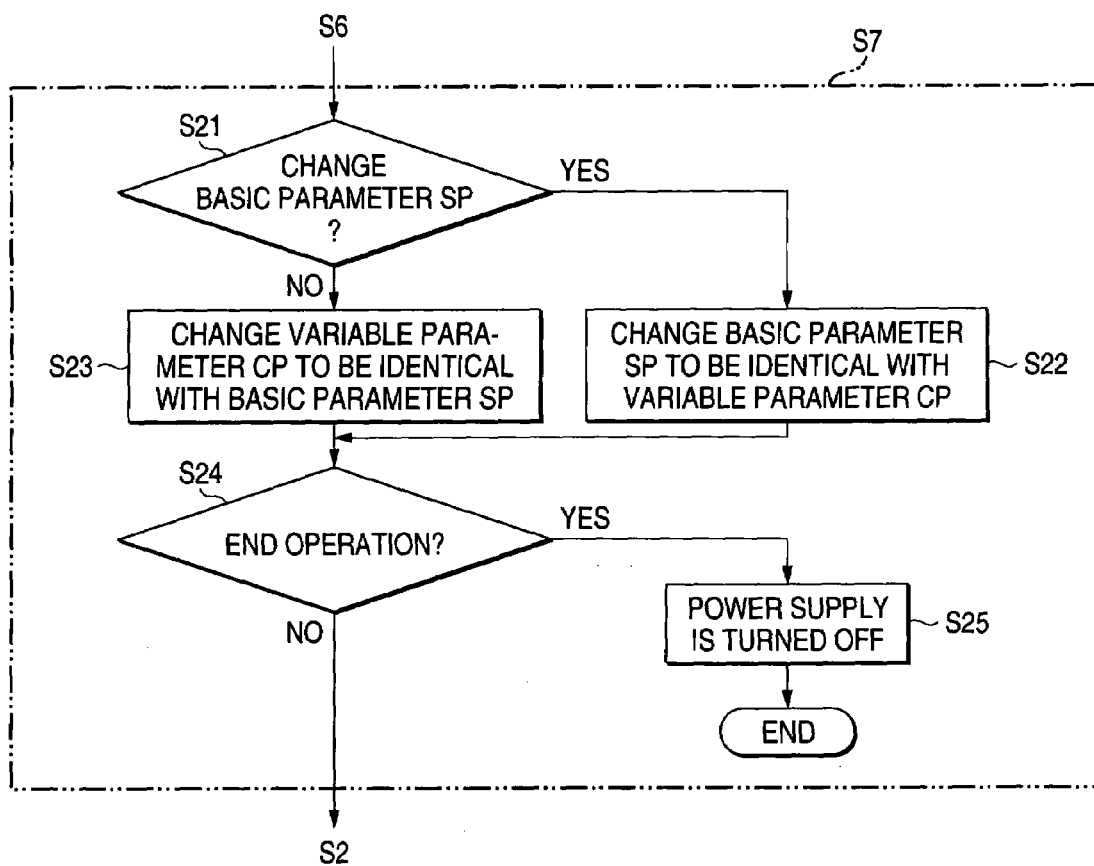
FIG. 5 is a flowchart showing a part of the running operation in detail.

A machine tool operation controlled using the machine tool control apparatus 11 configured as aforesaid will now be described according to flowcharts of FIGS. 3 and 5.

In step S1 of FIG. 3, the power supply is turned on. Thereafter, in step S2, the CPU 12 of the control apparatus 11 determines whether the initialization of the variable parameter CP is normal or not. If YES, then in step S3, the CPU 12 checks whether the basic parameter SP and the variable parameter are "matched" with each other or not. If NO, then in step S4, "variable parameter mismatch" is displayed on a screen of the CRT display 15. And, in step S5, it is determined whether the variable parameter CP is set or not. If NO, then in step S6, the operator determines whether or not collective setting is to be performed so that the variable parameter CP "matches" the basic parameter SP. If YES in this step 6, then the CPU 12 performs the process of step S7 in which the contents of the variable parameter CP and those of the basic parameter SP are collectively set to be identical with each other. FIG. 5 shows specific operations in the step 7. As shown in FIG. 5, in step 21, it is determined whether the basic parameter SP should be changed. If YES in the step S21, the operation proceeds to step S22. In the step S22, the basic parameter SP is changed to be identical with the variable parameter CP. If NO in the step S21, the variable parameter CP is changed to be identical with with the basic parameter SP in step 23. After the operation according to the step S22 or the step S23 is performed, in step S24, it is determined whether the operation should be ended. If Yes in the step S24, the power supply is turned off in step 25, and then the operation is ended. If NO in the step S24, then the operation returns to the step S2.

On the other hand, if the determination is YES in the step S2, then in step S8, a variable parameter CP anomaly is displayed on the display 15. Next, in step S9, the contents of the variable parameter CP are individually set, and then the operation returns to the step S2. When the determination is NO in the step S6, then the operation also proceeds to step S9.

Furthermore, if a result of checking the basic parameter SP and the variable parameter CP is "match", i.e., YES in the step S3, then the operation moves to step S10 such that automatic running of the machine tool is enabled. Then the operation proceeds to step S11 where the automatic running is performed. After that, in step S12, the machine tool is turned off.

Besides, if in the step S5 the determination is YES, i.e., it is determined that the variable parameter CP is set, then in step S13, the operator determines whether the variable parameter may remain thus set or not. If YES, then in step S14, the operator determines whether or not the temporary running is to be temporarily performed with the variable parameter CP remaining "mismatched". If the determination is NO in both the steps S13 and S14, the operation moves to the step S6.

If the determination is YES in the step S14, then in step S15, the operator switches ON a "temporary running confirmation" button 31 displayed on the screen of the display 15 and at the same time switches ON a "YES" button of an execution icon 32. Thereby, in step S16, "temporary running confirmation operation storage" switches ON, and at the same time the button 31 lights up. Thereafter, the conditions capable of automatic running of the machine tool are satisfied in the step S17. Furthermore, after the automatic running is performed in step S18, when the power supply of the machine tool is turned OFF in step S19, then in step S20, the "temporary running confirmation operation storage" switches OFF, and its record is erased. At the same time, the button 31 is turned off. And, when the power supply is turned ON again, the operation will start from the top of the step S1.

According to the machine tool control apparatus of the embodiment, the following advantages can be obtained.

(1) The embodiment is configured as follows. That is, the basic parameter SP and the variable parameter CP are checked with each other. At the same time, the check result is displayed on the screen of the CRT display 15. Thus, the operator can confirm whether or not the temporary running may be temporarily performed with the variable parameter CP remaining "mismatched". Therefore, the operator can be prevented from erroneously running the machine tool without confirming the "mismatch" between the basic parameter SP and the variable parameter CP. Thus, the machine tool can be prevented from breaking down.

(2) The embodiment is configured as follows. That is, the "mismatched" state of the variable parameter CP is erased after the automatic running of the machine tool is ended and the power supply is turned OFF. And, when the power supply is ON, it is rechecked whether the variable parameter CP "mismatch" is present or absent. Therefore, when the next running of the machine tool is performed, the "mismatched" state can be easily confirmed. Accordingly, after restart to run the machine tool, the operator can be prevented from erroneously running the machine tool without confirming the variable parameter CP "mismatch".

Figure 4:
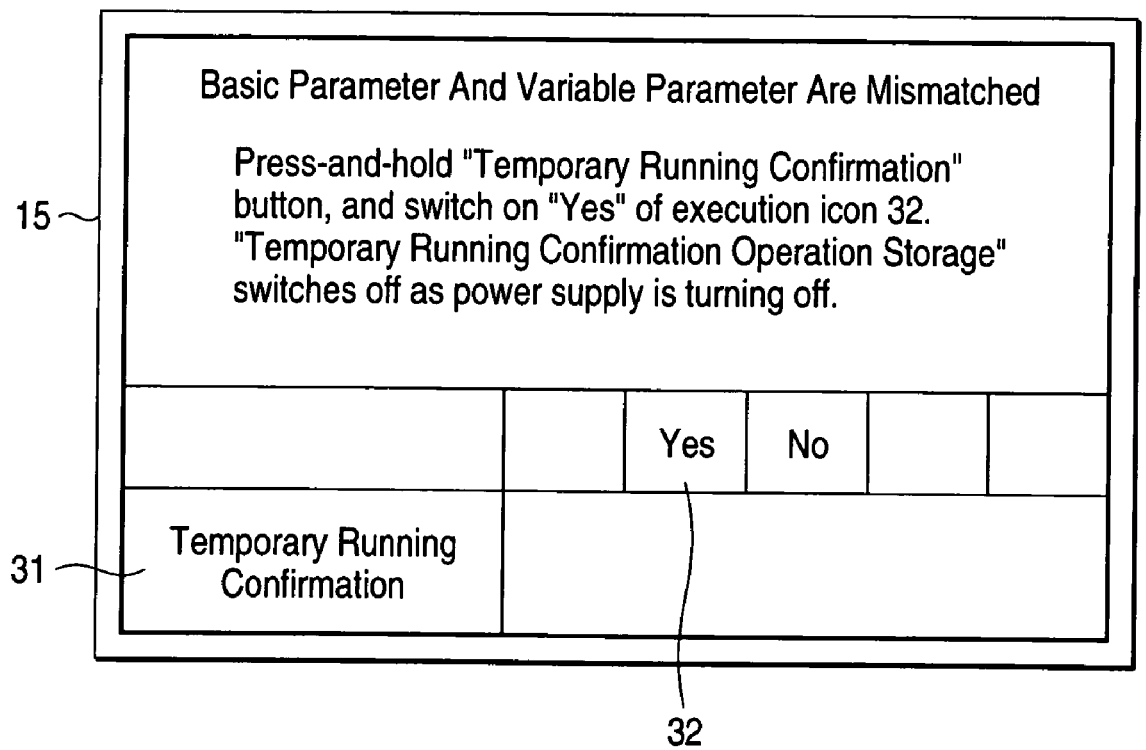
FIG. 4 is a front view showing a screen of data displayed on a CRT display.

(3) In the embodiment, the operator can confirm the checked result of both parameters by means of the screen functioning as the temporary running confirmation display unit of the CRT display 15 shown in FIG. 4. Thus, the operator can be prevented from making a confirmation error.

(4) In the embodiment, the check result is displayed on the screen of the CRT display. Therefore, the operator can easily perform the confirmation operation as to whether or not the variable parameter CP "matches" the basic parameter SP.

(5) In the embodiment, the operator can easily make a confirmation by means of the button 31 that is displayed on the CRT display 15 to confirm the variable parameter CP "mismatch".

Additionally, the embodiment may be modified as follows.

There may is provided parameter check unit that checks whether the basic parameter SP and variable parameter CP stored in the parameter storage area 24 are "matched" with each other or not. And, the invention may be embodied as the control apparatus 11 including notification unit that notifies the operator of a check result from this parameter check unit by means of the screen of the CRT display 15, a sound from a not-shown speaker, or furthermore a sheet, etc. printed by a printer, etc. Thereby, the operator can easily confirm whether the variable parameter CP is "mismatched", which can prevent the operator from erroneously running the machine tool.

According to the invention, the parameter check unit checks whether the basic parameter stored in the basic data memory and the variable parameter stored in the variable data memory are "matched" with each other or not. Besides, by the temporary running confirmation operation unit, the standard running is enabled when the checked result of both parameters is "match", and the temporary running confirmation operation is performed with the standard running disabled when the parameter check result is "mismatch". Therefore, after the machine tool is temporarily run based on the variable parameter with the basic parameter brought to a temporary halt, the machine tool can be prevented from being erroneously run without returning to the original basic parameter.

According to the invention, the storage of the temporary running confirmation operation based on the "mismatch" is erased when the power supply of the machine tool is ON, and the both parameters are freshly checked the next time the power supply of the machine tool is OFF. Therefore, upon restart of the machine tool, it can be easily determined whether or not the machine tool may be run based on the "mismatched" variable parameter.

According to the invention, the operator can confirm the checked result of the both parameters by means of the temporary running confirmation display unit, which can prevent the operator from making a confirmation error.

According to the invention, the check result is displayed on the screen of the display. Therefore, the operator can easily perform the confirmation operation as to whether or not the variable parameter "matches" the basic parameter.

According to the invention, the operator can easily makes a confirmation by means of the icon that is displayed on the display to confirm the variable parameter "mismatch".

What is claimed is:

1. A machine tool control apparatus comprising:
   a control program storage unit that stores therein control programs for performing standard running control in correspondence with specifications of a machine tool, the control program storage unit being provided with:
      a basic data memory that sets a control program for performing standard running, and
      a variable data memory that temporarily alters part of the control program to set a control program for performing temporary running;
   a parameter check unit that checks whether a basic parameter stored in the basic data memory and a variable parameter stored in the variable data memory are "matched" with each other; and
   a temporary running confirmation operation unit that enables the standard running when a parameter check result from the parameter check unit is "match" and that enables the temporary running by performing a temporary running confirmation operation while disenabling the standard running when the parameter check result is "mismatch".

2. The machine tool control apparatus according to claim 1,
   wherein the record of the "temporary running confirmation operation" is erased when a power supply of the machine tool is OFF; and
   a fresh check between the basic parameter and the variable parameter is performed the next time the power supply is ON.

3. The machine tool control apparatus according to claim 1, further comprising:
   a temporary running confirmation display unit that notifies an operator by displaying that the confirmation operation has been performed by the temporary running confirmation operation unit.

4. The machine tool control apparatus according to claim 3,
   wherein the temporary running confirmation display unit includes a display having a screen on which the parameter check result is displayed.

5. The machine tool control apparatus according to claim 3,
   wherein the temporary running confirmation operation unit is configured such that the operator makes a confirmation by means of an icon that is displayed on the display to confirm the variable parameter "mismatch" for the temporary running.

* * * * *